(12) United States Patent
Kamitani et al.

(10) Patent No.: US 9,878,615 B2
(45) Date of Patent: Jan. 30, 2018

(54) DIFFERENTIAL APPARATUS

(71) Applicant: JTEKT CORPORATION, Osaka-shi (JP)

(72) Inventors: Yasunori Kamitani, Fujimi (JP); Minoru Onitake, Kariya (JP); Tadashi Yoshisaka, Kawagoe (JP); He Jin, Kawagoe (JP)

(73) Assignee: JTEKT CORPORATION, Osaka-shi (JP)

( * ) Notice: Subject to any disclaimer, the term of this patent is extended or adjusted under 35 U.S.C. 154(b) by 0 days.

(21) Appl. No.: 15/477,274

(22) Filed: Apr. 3, 2017

(65) Prior Publication Data

US 2017/0291491 A1    Oct. 12, 2017

(30) Foreign Application Priority Data

Apr. 7, 2016    (JP) .................................. 2016-077431

(51) Int. Cl.
*F16H 48/24*    (2006.01)
*B60K 23/04*    (2006.01)
(Continued)

(52) U.S. Cl.
CPC .............. *B60K 23/04* (2013.01); *F16D 11/14* (2013.01); *F16H 48/08* (2013.01); *F16H 48/24* (2013.01);
(Continued)

(58) Field of Classification Search
None
See application file for complete search history.

(56) References Cited

U.S. PATENT DOCUMENTS 1,332,535 A * 3/1920 Hartley .................. F16H 48/06
                                                    475/230
5,890,989 A * 4/1999 Yamazaki .............. B60K 23/08
                                                    180/247
(Continued)

FOREIGN PATENT DOCUMENTS

JP    2015-87015    5/2015

OTHER PUBLICATIONS

U.S. Appl. No. 15/477,455, filed Apr. 3, 2017, Kamitani, et al.
U.S. Appl. No. 15/477,481, filed Apr. 3, 2017, Kamitani, et al.

*Primary Examiner* — Justin Holmes
(74) *Attorney, Agent, or Firm* — Oblon, McClelland, Maier & Neustadt, L.L.P.

(57) ABSTRACT

A differential apparatus includes a differential mechanism, a differential case that accommodates the differential mechanism, and a clutch mechanism that transmits a driving force between the differential case and the differential mechanism. The clutch mechanism includes a slide member movable inside the differential case in an axial direction and an actuator. The slide member has a first meshable portion at one end in the axial direction, is allowed move relative to the differential mechanism in the axial direction, and is prevented from rotating relative to the differential mechanism. The differential case includes a first case member and a second case member that are united to form the differential case. The first case member integrally includes a second meshable portion and a flange portion that the ring gear is fastened to. When the actuator is activated the first meshable portion meshes with the second meshable portion so that the differential case and the slide member are coupled to present a relative rotation between the differential case and the slide member.

4 Claims, 10 Drawing Sheets

(51) Int. Cl.
*F16H 48/08* (2006.01)
*F16H 48/40* (2012.01)
*F16D 11/14* (2006.01)
*F16H 48/30* (2012.01)
*F16H 48/38* (2012.01)

(52) U.S. Cl.
CPC ............ *F16H 48/30* (2013.01); *F16H 48/40* (2013.01); *F16H 2048/385* (2013.01)

(56) References Cited

U.S. PATENT DOCUMENTS

| | | | | |
|---|---|---|---|---|
| 6,027,422 | A * | 2/2000 | Yamazaki | B60K 23/04 192/53.36 |
| 7,294,085 | B2 * | 11/2007 | Pistagnesi | B60K 17/16 475/231 |
| 2002/0132694 | A1 * | 9/2002 | Okazaki | F16H 48/08 475/231 |
| 2003/0184171 | A1 * | 10/2003 | Teraoka | F16H 48/24 310/80 |
| 2004/0166985 | A1 * | 8/2004 | Sudou | F16H 48/08 475/230 |
| 2015/0114786 | A1 | 4/2015 | Seidl | |

* cited by examiner

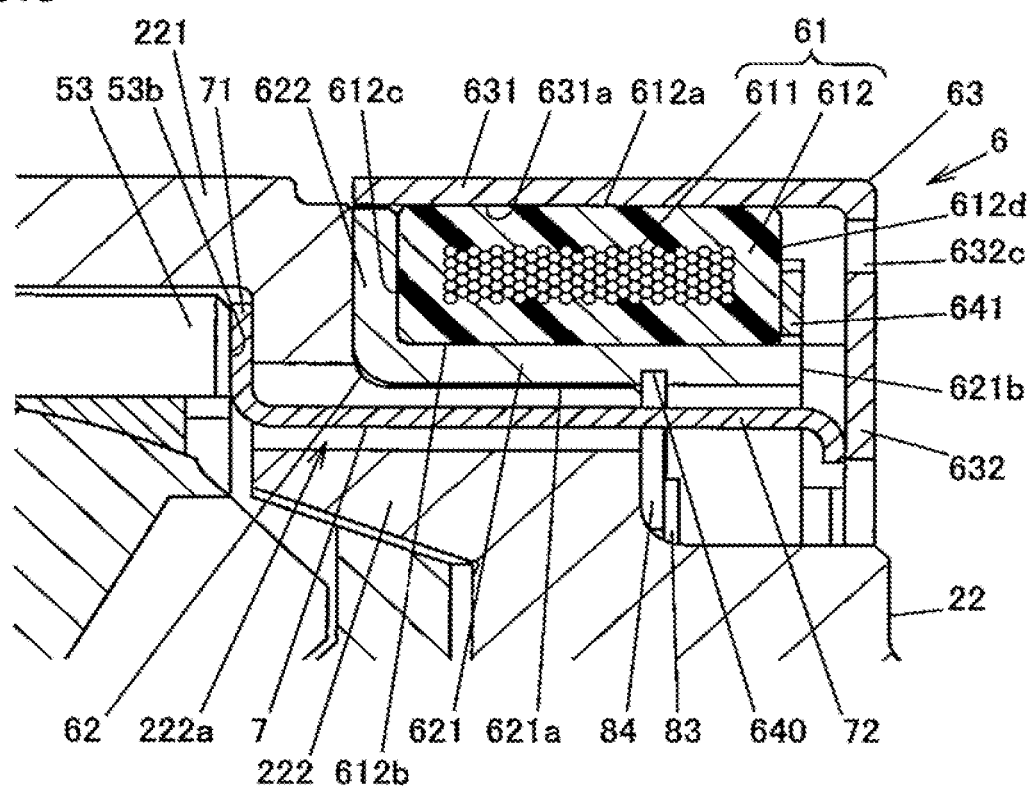

DIFFERENTIAL APPARATUS

INCORPORATION BY REFERENCE

The disclosure of Japanese Patent Application No. 2016-077431 filed on Apr. 7, 2016 including the specification, drawings and abstract, is incorporated herein by reference in its entirety.

BACKGROUND OF THE INVENTION

1. Field of the Invention

The invention relates to a differential apparatus that allows an input driving force be deferentially outfitted from a pair of output members.

2. Description of Related Art

Differential apparatuses that allow an input driving force to be differentially outputted from a pair of output members have been used, for example, as differentials in vehicles. Some of this type of differential apparatuses can interrupt the transmission of the input driving force to the output members, as disclosed in, for example, Japanese Patent Application Publication No. 2015-87015 A).

The differential apparatus disclosed in JP 2015-87015 A includes a differential mechanism having two differential gears supported on a shaft-shaped journal and two sideshaft gears, a differential case (housing) that accommodates the differential mechanism, a carrier element rotatably accommodated in the differential case, a second clutch section fixed to the carrier element, a first clutch section engageable with the second clutch section, and an actuator for moving the first clutch section relative to the second clutch section in an axial direction. A driving force is inputted to the differential case from a driving gear that is welded or bolted to the outer circumferential surface of the differential case. The carrier element has two bores, and the journal is inserted through the bores and fixed by a securing pin.

The first clutch section includes an annular portion and multiple axial projections projecting from the annular portion in the axial direction. The tip end of each axial projection is provided with a toothed ring segment engageable with the second clutch section. The annular portion of the first clutch section is located outside the differential case, and the axial projections of the first clutch section are inserted through axial holes in a side wall of the differential case. This couples the first clutch section to the differential case in a manner that allows the first clutch section to move relative to the differential case in the axial direction and that prevents the first clutch section from rotating relative to the differential case.

When the first clutch section moves toward the second clutch section in the axial direction by actuation of the actuator, the toothed ring segments of the axial projections engage with the second clutch section, so that the carrier element rotates along with the differential case. Thus, the driving force inputted to the differential case from the driving gear is transmitted to the differential gears via the first clutch section, the second clutch section, and the carrier element.

In contrast, when the actuator deactivated, the first clutch section is separated from the second clutch section by a return spring. This disengages the first clutch section from the second clutch section, thereby allowing the carrier element to rotate relative to the differential case. Accordingly, the transmission of the driving force to the differential mechanism from the differential case is interrupted.

According to the differential apparatus disclosed in JP 2015-87015 A, the driving force inputted to the differential case is transmitted to the first clutch section through the side wall of the differential case. Since the side wall has multiple axial holes that the axial projections are inserted through, the side wall may be hard to have sufficient structural strength. Increasing the thickness of the differential case may allow the side wall to have sufficient strength to transmit enough driving force to the first clutch section. However, the increase in the thickness of the differential case increases the weight and size of the differential case accordingly.

SUMMARY OF THE INVENTION

An object of the invention is to provide a differential apparatus that selectively transmits a driving force and that reduces an increase in the weight and size of a differential case.

An aspect of the invention provider a differential apparatus including a differential mechanism that allows a driving force inputted to an input member to be differentially distributed to a pair of output members, a differential case that accommodates the differential mechanism, and a clutch mechanism that transmits the driving force between the differential case and the input member of the differential mechanism. The clutch mechanism includes a slide member and an actuator. The slide member is arranged in a manner that allows the slide member to move relative to the differential mechanism inside the differential case in a central axial direction along a rotation axis of the differential case and that does not allow the slide member to rotate relative to the differential mechanism inside the differential case. The actuator supplies the slide member with a moving force that moves the slide member in the central axial direction. The slide member includes a first meshable portion that is located at one end of the slide member in the central axial direction and that has multiple meshable teeth. The differential case includes multiple case members that an united to form the differential case. A first case member of the case members includes a second meshable portion having multiple meshable teeth facing the first meshable portion in the central axial direction. The first case member further includes a joint portion that an input gear that rotates along with the differential case is joined to. The differential apparatus switches between a coupled state and a decoupled state in accordance with whether the actuator is activated or deactivated. The coupled state causes the first meshable portion and the second meshable portion to mesh with each other in a circumferential direction so that the differential case and the slide member are coupled not to allow a relative rotation between the slide member and the differential case. The decoupled state decouples the differential case and the slide member from each other to allow the relative rotation between the slide member and the differential case.

This aspect of the differential apparatus induces an increase in the weight and size of the differential case and selectively transmits the driving force.

BRIEF DESCRIPTION OF THE DRAWINGS

The foregoing and further features and advantages of the invention will become apparent from the following description of example embodiments reference to the accompanying drawings, wherein like numerals are used to represent like elements and wherein:

FIG. 6 is an enlarged partial sectional view illustrating the differential apparatus;

DETAILED DESCRIPTION OF EMBODIMENTS

A first embodiment of the invention is described with reference to FIG. 1 through FIG. 7B.

Figure 1:
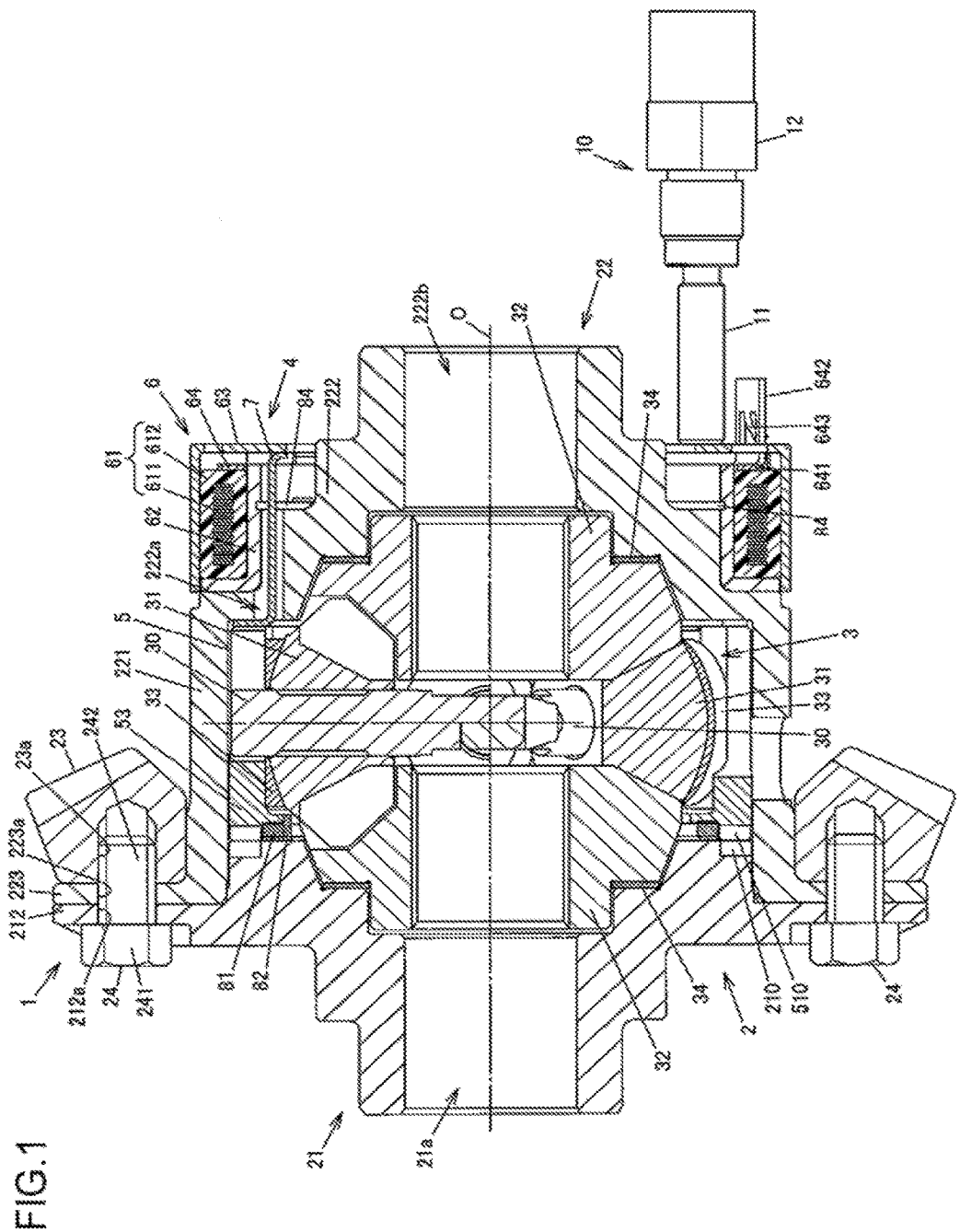
FIG. 1 is a sectional view illustrating an example structure of a differential apparatus according to a first embodiment of the invention.
Figure 2:
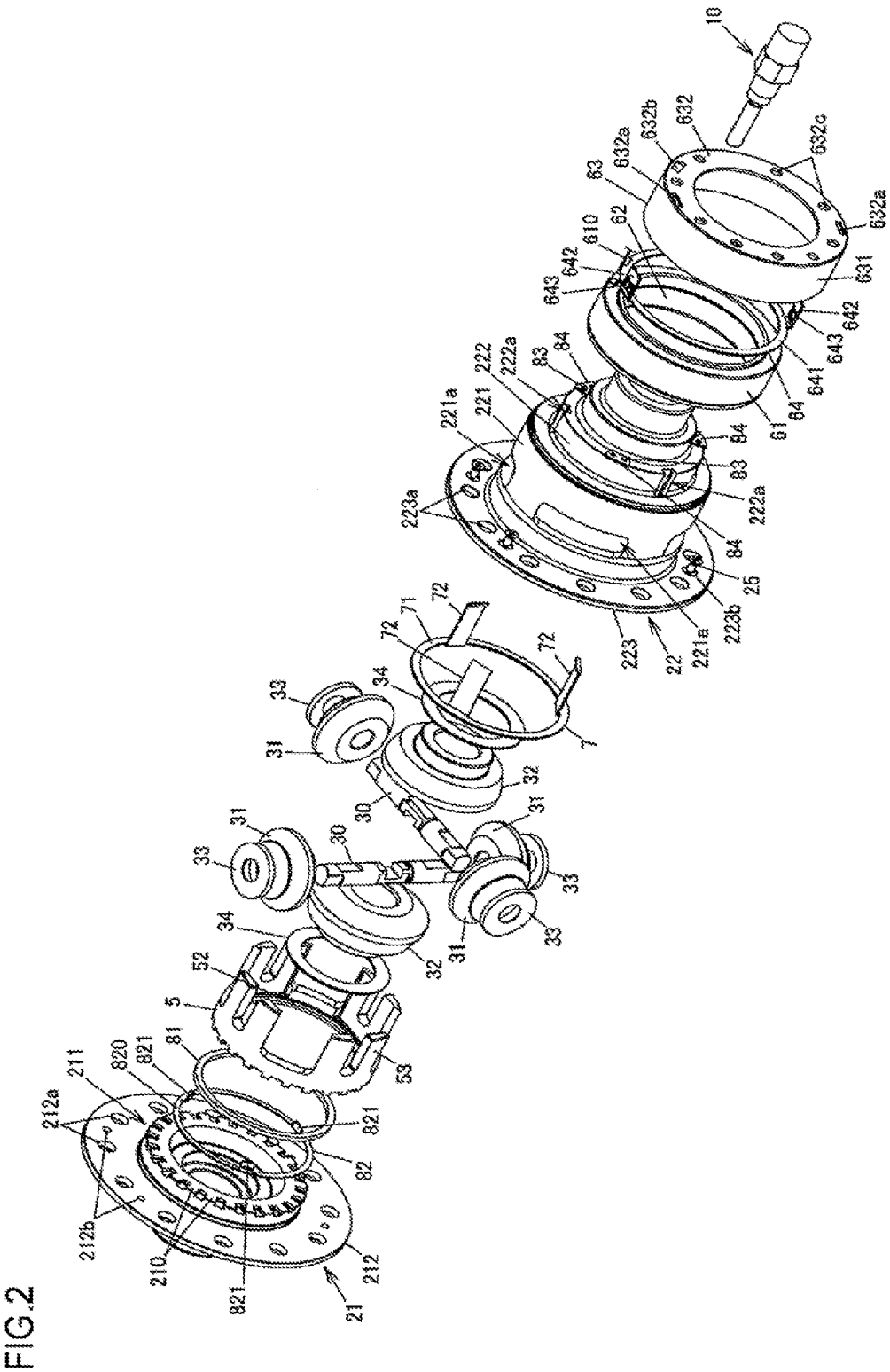
FIG. 2 is an exploded perspective view illustrating the differential apparatus.
Figure 3:
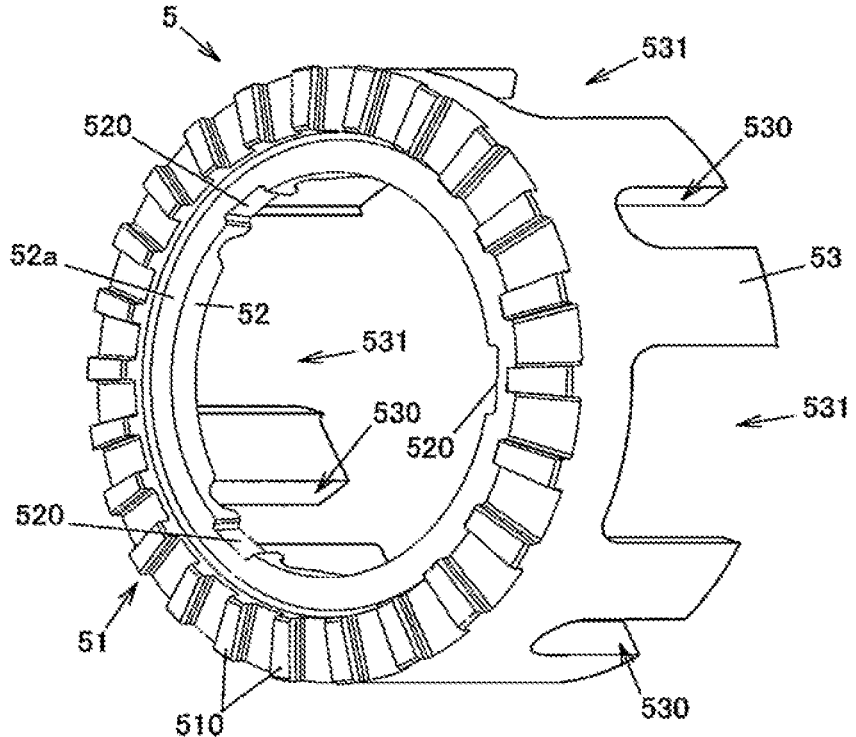
FIG. 3 is a perspective view illustrating a slide member of the differential apparatus.
Figure 4:
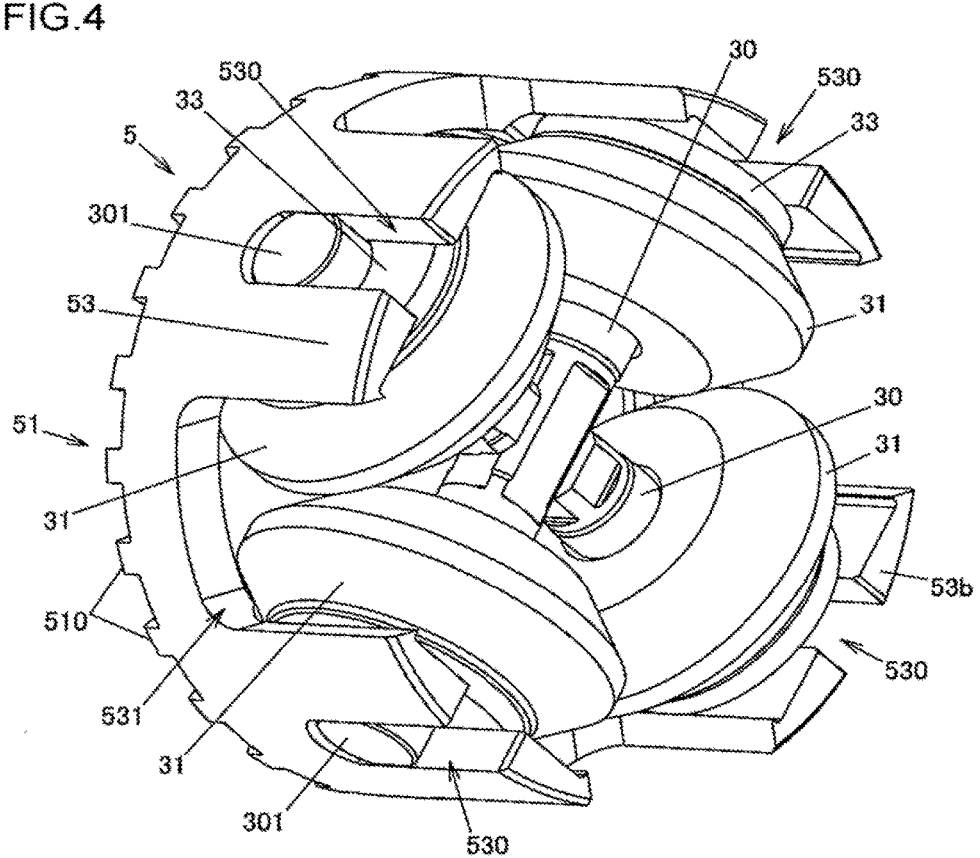
FIG. 4 is a perspective view illustrating a differential mechanism of the differential apparatus.
Figure 5:
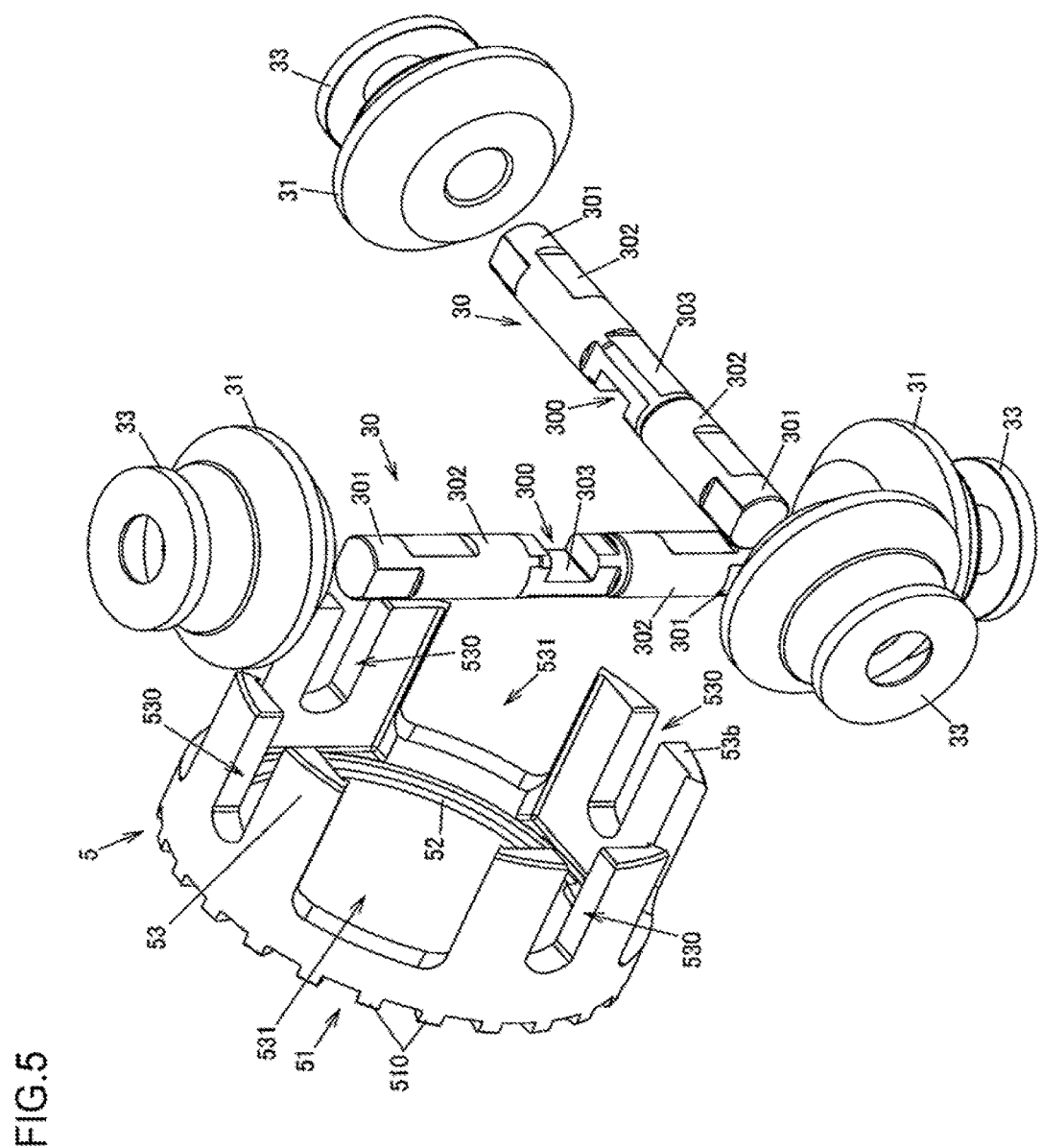
FIG. 5 is an exploded perspective view illustrating the differential mechanism.
Figure 7A:
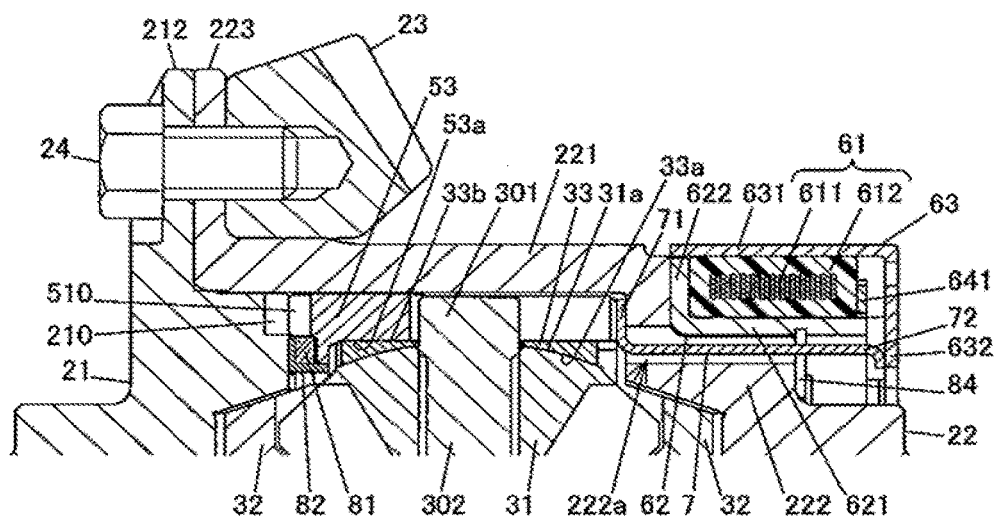
FIG. 7A is an explanatory diagram illustrating how the differential apparatus operates when an actuator is deactivated.
Figure 7B:
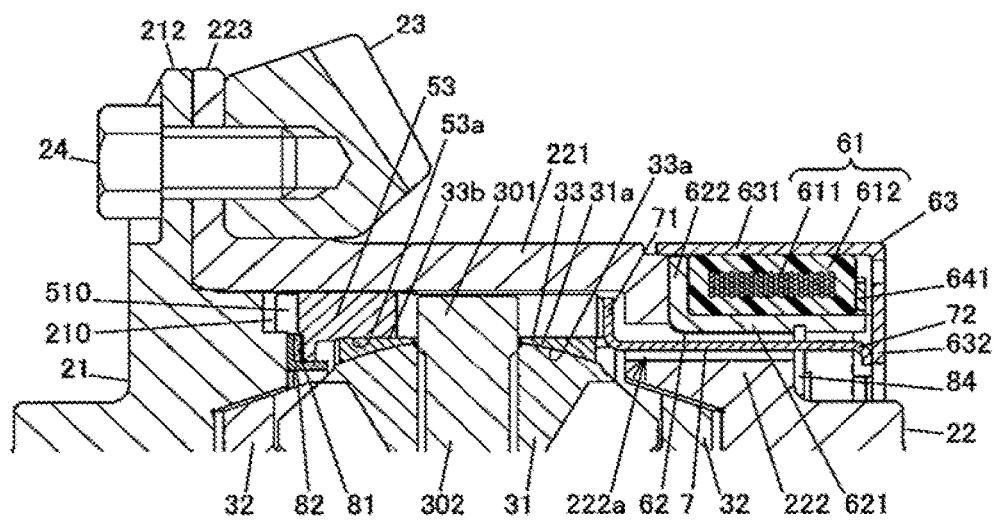
FIG. 7B is an explanatory diagram illustrating how the differential apparatus operates when the actuator is activated.

FIG. 1 is a sectional view illustrating an example structure of a differential apparatus 1 according to the first embodiment of the invention. FIG. 2 an exploded perspective view illustrating the differential apparatus 1. FIG. 3 is a perspective view illustrating a slide member 5 of the differential apparatus 1. FIG. 4 is a perspective view illustrating a differential mechanism 3 of the differential apparatus 1. FIG. 5 is an exploded perspective view illustrating the differential mechanism 3. FIG. 6 is an enlarged partial sectional view illustrating the differential apparatus 1. FIG. 7A is an explanatory diagram illustrating how the differential apparatus 1 operates when an actuator 6 is deactivated. FIG. 7B is an explanatory diagram illustrating how the differential apparatus operates when the actuator 6 is activated.

The differential apparatus 1 is used to allow a driving force of a vehicle driving source, such as an engine to be differentially distributed to a pair of output shafts. Specifically according to this embodiment, the differential apparatus 1 is mounted on a four-wheel-drive vehicle that has a pair of right and left main drive wheels (e.g., front wheels) and a pair of right and left auxiliary drive wheels (e.g., rear wheels). The driving force of the driving source is always transmitted to the pair of right and left main drive wheels and is selectively transmitted to the pair of right and left auxiliary drive wheels depending on traveling conditions. The differential apparatus 1 is used as a differential for distributing the driving force to the pair of right and left auxiliary drive wheels. When the driving force is transmitted to only the main drive wheels, the vehicle operates in a two-wheel drive mode. When the driving force is transmitted to both the main drive wheels and the auxiliary drive wheels, the vehicle operates in a four-wheel drive mode. When the vehicle operates in a four-wheel drive mode, the differential apparatus 1 distributes an input driving force to right and left drive shafts for the auxiliary drive wheels.

The differential apparatus 1 includes a differential case 2 rotatably supported by a differential carrier that is not illustrated in the drawings, a differential mechanism 3 accommodated in the differential case 2, and a clutch mechanism 4 that selectively transmits the driving force between the differential case 2 and the differential mechanism 3. Lubricating oil is introduced in the differential case 2 to lubricate the differential mechanism 3.

The differential mechanism 3 includes a pinion shaft 30 as an input member, multiple (four in this embodiment) pinion gears 31 supported to revolve around a rotation axis O of the differential case 2, and a pair of side gears 32 as a pair of output members. The pinion gears 31 and the pair of side gears 32 are bevel gears and are in mesh with each other with their gear axes perpendicular to each other. One of the pair of side gears 32 is coupled to the right drive shaft and is presented from rotating relative to the right drive shaft. The other of the pair of side gears 32 is coupled to the left drive shaft and is prevented from rotating relative to the left drive shaft. Although the pinion gears 31 and the side gears 32 have actually gear teeth, FIGS. 2, 4, and 5 omit the illustration of the gear teeth for the sake of simplicity.

The differential mechanism 3 allows the driving force inputted to the pinion shaft 30 to be differentially outputted to the pair of drive shafts. According to this embodiment, the differential mechanism 3 has a pair of pinion shafts 30. Two of the four pinion gears 31 are rotatably supported on one pinion shaft 30, and the other two of the four pinion gears 31 are rotatably supported on the other pinion shaft 30.

As shown in FIG. 5, each pinion shaft 30 integrally includes a pair of engaged portions 301 that are engaged with a slide member 5 of the clutch mechanism 4 as described later, a pair of pinion gear supporting portions 302 that are inserted through the pinion gears 31, and a connector 303 that connects the pair of pinion gear supporting portions 302 together. As a whole, each pinion shaft 30 has a shaft shape. One of the pair of engaged portions 301 is located at one end of the pinion shaft 30. The other of the pair of engaged portions 301 is located at the other end of the pinion shaft 30. The connector 303 is located at a middle portion of the pinion shaft 30 in an axial direction of the pinion shaft 30. Each pinion gear supporting portion 302 is located between the engaged portion 301 and the connector 303 and rotatably supports the pinion gear 31.

The pair of the pinion shafts 30 engage with each other at their middle portion in their axial direction. Specifically, the connector 303 of one pinion shaft 30 is fitted into a recess formed between the pair of pinion gear supposing portions 302 of the other pinion 30, and the connector 303 of the other pinion shaft 30 is fitted into a recess 300 formed between the pair of pinion gear supporting portions of one pinion shaft 30. The pair of pinion shafts 30 are perpendicular to each other when viewed from a direction along the rotation axis O of the differential case 2.

The clutch mechanism 4 includes the slide member 5 movable in a central axial direction along the rotation axis O of the differential case 2, the actuator 6 for supplying the slide member 5 with a moving force that moves the slide member 5 in the central axial direction, and a pressing member 7 located between the slide member 5 and the actuator 6. The slide member 5 is located inside the differential case 2. The actuator 6 is located outside the differential case 2. The pressing member 7 transmits the moving force of the actuator 6 to the slide member 5. The slide member 5 is pressed and moved in the central axial direction by the pressing member 7.

The slide member 5 has a round cylindrical shape with a central axis in coincidence with the rotation axis O of the differential case 2. The slide member 5 is arranged in a manner that allows the slide member 5 to move relative to the differential mechanism 3 in the central axial direction along the rotation axis O of the differential case 2 and that prevents the slide member 5 from rotating relative to the differential mechanism 3. The slide member 5 is formed by forging a steel material. As shown in FIG. 3, the slide member 5 integrally includes a first meshable portion 51 that is located at one end of the slide member 5 in the central axial direction and that has multiple meshable teeth 510, an annular inner rib portion 52 projecting toward the inside of the first meshable portion 51, and a cylindrical portion 53 having engaging portions 530 that engage with the pinion shafts 30 in a circumferential direction. The first meshable portion 51 is meshable with a second meshable portion 211 of the differential case 2 in the circumferential direction. The second meshable portion 211 is described later. Each engaging portion 530 goes through the cylindrical portion 53 between the inner and outer circumferential surfaces of the cylindrical portion 53 and is formed as a groove extending in the central axial direction of the slide member 5.

Each engaging portion 530 engages with the corresponding engaged portion 301 located at each end of the pinion shaft 30. The engagement of the engaged portions 301 of the pinion shafts 30 with the engaging portions 530 of the slide member 5 allows the slide member 5 to move in the central axial direction relative to the pinion gears 31 that are rotatably supported on the pinion shafts 30 while preventing the slide member 5 from rotating relative to the pinion gears 31. The pinion gears resolve around the rotation axis O of the differential case 2 along with the slide member 5. Specifically, the pinion gears 31 revolve around the rotation axis O while the slide member 5 rotates on the rotation axis O. According to tins embodiment, the cylindrical portion 53 has four engaging portions 530 so that all the engaged portions 301 located at the ends of the pinion shafts 30 can be engaged with the slide member 5.

As shown in FIG. 7A and FIG. 7B, a washer 33 is located between a back surface 31a of each of the pinion gears 31 and an inner circumferential surface 53a of the cylindrical portion 53 of the slide member 5. An inner surface 33a of the washer 33 is partly spherical and faces the back surface 31a of the pinion gear 31. An outer surface 33b of the washer 33 is flat and faces the inner circumferential surface 53a of the cylindrical portion 53 of the slide member 5. When the pinion gear 31 rotates on the pinion shaft 30, the back surface 31a of the pinion gear 31 slides on the inner surface 33a of the washer 33. When the slide member 5 moves in the central axial direction relative to the pinion shafts 30, the inner circumferential surface 53a of the cylindrical portion 53 of the slide member 5 slides on the outer surface 33b of the washer 33.

The cylindrical portion 53 of the slide member 5 has multiple openings 531 that lubricating oil flows through. According to this embodiment, the cylindrical portion 53 has four openings 531 that are equally spaced from each other in the circumferential direction of the cylindrical portion 53. Each opening 531 goes through the cylindrical portion 53 in the radial direction of the cylindrical portion 53 and has an open end on the side opposite to the side where the first meshable portion 51 is located. The number and shape of the openings 531 are not limited to those described above. The cylindrical portion 53 can have any number of the openings 531 of any shape.

The inner rib portion 52 of the slide member 5 has an annular receiving surface 52a that receives a biasing forces of a biasing member 81 as described later. The inner rib portion 52 further has multiple fitting portions 520 that are separately fitted with multiple projections 821 (refer to FIG. 2) of a retainer 82 that retains the biasing member 81. The fitting portions 520 are recessed in the receiving surface 52a.

The pressing member 7 has a ring portion 71 and multiple leg portions 72. The ring portion 71 abuts against an axial end surface 53b of the cylindrical portion 53 of the slide member 5. The axial end surface 53b is located on the side opposite to the side where the first meshable portion 51 is located. The leg portions 72 extend from the ring portion 71 in a direction parallel to the rotation axis O of the differential case 2. According to this embodiment, the pressing member 7 has three leg portions 72. The pressing member 7 is formed by press working from a steel sheet, and a tip end of each leg portion 72, opposite to a base end where the ring portion 71 is located, is bent inward.

The actuator 6 includes an annular electromagnet 61, a yoke 62, and an armature 63. The annular electromagnet 61 has a coil winding 511 and a molding resin member 612 that encapsulates the coil winding 611. The yoke 62 provides a magnetic path for magnetic flux that is generated by the electromagnet 61 when the coil winding 611 is energized. The armature 63 is guided in the direction of the rotation axis O of the differential case 2 while in sliding contact with the molding resin member 612. The molding resin member 612 is rectangular in section along the rotation axis O. A magnetic force generated by energizing the coil winding 611 causes the armature 63 to move the slide member 5 in such a direction that the first meshable portion 51 meshes with the second meshable portion 211 of the differential case 2. The moving force of the actuator 6 is transmitted to the slide member 5 through the pressing member 7, thus causing the first meshable portion 51 of the slide member 5 to mesh with the second meshable portion 211.

The coil winding 611 is supplied with an exciting current via an electric wire 610 (refer to FIG. 2) from a controller that is not illustrated in the drawings. Supplying the exciting current to the coil winding 611 activates the actuator 6. Since the actuator 6 is located outside the differential case 2, it is easy to supply the current to the coil winding 611. The yoke 62 is made of a soft magnetic metal such as low-carbon steel. As shown in FIG. 6, the yoke 62 integrally includes a cylindrical portion 621 and a rib portion 622. The cylindrical portion 621 covers an inner circumferential surface 612b of the molding resin member 612 from inside. The rib portion 622 projects outwardly from an axial end portion of the cylindrical portion 621 and covers an axial end surface 612c of the molding resin member 612. The bore diameter of the cylindrical portion 621 is slightly larger than the outside diameter of facing portion of the differential case 2 that faces an inner circumferential surface 621a of the cylindrical portion 621.

The circumferential surface 621a of the cylindrical portion 621 has an annular recess 640 that multiple (three in this embodiment) plates 84 fit into. The plates 84 are made of a non-magnetic material and are fixed to the differential case 2 by press-fit pins 83. The fitting of the plates 84 into the annular recess 640 prevents the yoke 62 to move relative to the differential case 2 in the axial direction. The axial width of the annular recess 640 is larger than the thickness of the plates 84 so as to prevent a rotational resistance between the yoke 62 and the plates 84 when the differential case 2 rotates.

A stopper ring 64 is fixed to an end of the cylindrical portion 621 of the yoke 62 that is opposite to the end where the rib portion 622 projects. The stopper ring 64 is made of a non-magnetic metal such as austenite stainless steel and integrally includes an annular portion 641, a pair of projections and folded-back portions 643. The annular portion 641 is fixed to the yoke 62. The pair of projections 642 project from the annular portion 641 at two positions on the circumference of the annular portion 641. Each of the folded-back portions 643 is folded back at an acute angle from the tip end of a corresponding one of the pair of projections 642. The pair of projections 642 engage with the differential carrier that is not illustrated in the drawings, thereby preventing rotation of the stopper ring 64. The annular portion 641 is fixed to the yoke 62, for example, by welding.

The armature 63 is made of a soft magnetic metal such as low-carbon steel and integrally includes an outer annular portion 631 located around the electromagnet 61 and a side plate portion 632 that faces the electromagnet 61 in the axial direction. The outer annular portion 631 has a round cylindrical shape and covers the outer circumference of the electromagnet 61. The side plate portion 632 projects inward from an axial end of the outer annular portion 631. The side plate portion 632 faces an axial end surface 612d of the molding resin member 612 in the axial direction. The axial end surface 612d is opposite to the axial end surface 612c that faces the rib portion 622 of the yoke 62. In addition, the side plate portion 632 faces both the annular portion 641 of the stopper ring 64 and an axial end surface 621b of the cylindrical portion 621 of the yoke 62 in the axial direction.

An inner circumferential surface 631a of the outer annular portion 631 of the armature 63 is in contact with an outer circumferential surface 612a of the molding resin member 612 so that the armature 63 is supported by the electromagnet 61. When the armature 63 moves in the axial direction, the inner circumferential surface 631a of the outer annular portion 631 slides on the outer circumferential surface 612a of the molding resin member 612.

As shown in FIG. 2, the side plate portion 632 of the armature 63 has engagement holes 632a that engage with the projections 642 of the stopper ring 64, a wire insertion hole 632b that the electric wire 610 is inserted through, and multiple (nine in the example shown in FIG. 2) oil holes 632c that lubricating oil flows through. The leg portions 72 of the pressing member 7 abut against an end portion of the side plate portion 632 on the inner circumferential side of the side plate portion 632. The folded-back portions 643 of the stopper ring 64 prevent the armature 63 from being detached from the stopper ring 64. The engagement of the projections 642 with the engagement holes 632a prevents the armature 63 from rotating relative to the differential carrier. Specifically, the protections 642 of the stopper ring 64 are inserted through the engagement holes 632a and engage with the differential carrier.

The differential case 2 includes a first case member 21 and a second case member 22 that are aligned in the direction of the rotation axis O. The first case member 21 and the second case member 22 are united to form the differential case 2. A flat annular washer 34 is located between the first case member 21 and the pair of side gears 32 of the differential mechanism 3 and is also located between the second case member 22 and the pair of side gears 32.

The second case member 22 has a round cylindrical shape with a bottom and accommodates the differential mechanism 3 and the slide member 5. The second case member 22 integrally includes a cylindrical portion 221 having a round cylindrical shape, a wall portion 222 projecting inwardly from one end of the cylindrical portion 221 that is opposite to the side where the first case member 21 located, and a flange portion 223 projecting outwardly from the other end of the cylindrical portion 221. The electromagnet 61 and the yoke 62 are located in a corner formed between the cylindrical portion 221 and the wall portion 222.

The cylindrical portion 221 has multiple oil holes 221a that lubricating oil flows through. The wall portion 222 has multiple (three in this embodiment) insertion holes 222a for transmitting the moving force of the actuator 6 to the slide member 5. The wall portion 222 further has a shaft insertion hole 222b that receives a drive shaft that is coupled to one of the pair of side gears 32 so as not to rotate relative to the one of the pair of the side gears 32. Each of the leg portions 72 of the pressing member 7 is inserted through a corresponding one of the insertion holes 222a. The insertion holes 222a and the shaft insertion hole 222b go through the wall portion 222 in the direction parallel to the rotation axis O.

The first case member 21 is shaped, for example, by forging and has a disc shape that covers an opening of the second case member 22. The first case member 21 integrally includes the second meshable portion 211 with multiple meshable teeth 210 and a flange portion 212 that butts against the flange portion 223 of the second case member 22. The second meshable portion 211 faces the first meshable portion 51 in the central axial direction of the slide member 5. The slide member 5 is located between the second meshable portion 211 of the first case member 21 and the wall portion 222 of the second case member 22. The first case member 21 has a shaft insertion hole 21a that receives a drive shaft that is coupled to the other of the pair of the side gears 32 so as not to rotate relative to the other of the pair of the side gears 32.

A driving force from a ring gear 23 (refer to FIG. 1) as an input gear is inputted to the differential case 2. The ring gear 23 is fixed to the flange portions 212 and 223 of the first and second case members 21 and 22. The flange portions 212 and 223 serve as a joint portion that the ring gear 23 is joined to. According to this embodiment, the flange portion 212 of the first case member 21 has multiple bolt insertion holes 212a, and the flange portion 223 of the second case member 22 has multiple bolt insertion holes 223a. The ring gear 23 is fixed to the differential case 2 by multiple fastening bolts 24 that are separately inserted through the bolt insertion holes 212a and 223a. This fixation allows the ring gear 23 to rotate along with the differential case 2. Each of the fastening bolts 24 has a head 241 and a shank 242 with an external thread. The head 241 abuts against the flange portion 212 of the first case member 21, and the shank 242 is inserted through the bolt insertion holes 212a and 223a, so that the fastening bolt 24 is screwed into a threaded hole 23a in the ring gear 23.

The ring gear 23 can be fixed to the differential case 2 by methods other than by bolting. For example, the ring gear 23 may be fixed to the first case member 21 by welding. In this case, a portion of the first case member 21 that is welded to the ring gear 23 serves as the joint portion.

The first case member 21 and the second case member 22 are united by multiple coupling bolts 25 (refer to FIG. 2. According to this embodiment, the first case member 21 and the second case member 22 are united by four coupling bolts 25 before the ring gear 23 is fastened. FIG. 2 illustrates three of the four coupling bolts 25. The coupling bolts 25 are inserted through bolt insertion holes 223b in the flange portion 223 of the second case member 22 and are screwed into threaded holes 212b in the first case member 21.

The biasing member 81 and the retainer 82 that retains the biasing member 81 are located between the first case member 21 and the inner rib portion 52 of the slide member 5. The biasing member 81 is an elastic body. The retainer 82 includes an annular body 820 and three projections 821 that extend from the body 820 toward the wall portion 222 of the second case member 22. The projections 821 are fitted with the fitting portions 520 of the inner rib portion 52 of the slide member 5 so as to prevent the retainer 82 front rotating relative to the slide member 5.

The biasing member 81 is compressed in the central axial direction of the slide member 5 by actuation of the actuator 6. The slide member 5 is biased toward the wall portion 222 of the second case member 22 by a restoring force (i.e., a biasing force) of the biasing member 81. For example, a coil spring can be used as the biasing member 81. Alternatively, the biasing member 81 may be made of rubber. According to this embodiment, the biasing member 81 is annular in shape and is located between the differential mechanism 3 and the cylindrical portion 221 of the second case member 22. Alternatively, the biasing member 81 may be divided in multiple separate portions that are located at different positions and that face the inner rib portion 52 of the slide member 5.

The differential apparatus 1 switches between a coupled state and a decoupled state in accordance with whether the actuator 6 is activated or deactivated. In the coupled state, the first meshable portion 51 and the second meshable portion 211 mesh with each other in the circumferential direction so that the slide member 5 and the differential case 2 are coupled to prevent a relative rotation between the slide member 5 and the differential case 2. In the decoupled state, the slide member 5 and the differential case 2 are decoupled to allow the relative rotation between the slide member 5 and the differential case 2.

FIG. 7A is a partial sectional view illustrating the differential apparatus 1 seen when the actuator 6 is deactivated. FIG. 7B is a partial sectional view illustrating the differential apparatus 1 seen when the actuator 6 is activated.

The actuator 6 is deactivated when no exciting current is supplied to the coil winding 611 of the electromagnet 61. When the actuator 6 is deactivated, the restoring force of the biasing member 81 moves the slide member 5 toward the wall portion 222 of the second case member 22, thus disengaging the first meshable portion 51 and the second meshable portion 211 from each other. Further, when the electromagnet 61 is de-energized, the restoring force of the biasing member 81 is transmitted to the armature 63 through the slide member 5 and the pressing member 7, thus returning the armature 63 to an initial position away from the wall portion 222.

When the actuator 6 is deactivated, the transmission of the driving force from the differential case 2 to the differential mechanism 3 is interrupted because the differential case 2 and the slide member 5 are allowed to rotate relative to each other. Thus, the driving force inputted to the differential case 2 from the ring gear 23 is not transmitted to the drive shafts so that the vehicle operates in a two-wheel drive mode.

When the exciting current is supplied so the coil winding 611 of the electromagnet 61, the magnetic force of the electromagnet 61 moves the armature 63 in the axial direction such that the side plate portion 632 of the armature 63 approaches an axial end surface 621b (refer to FIG. 6) of the cylindrical portion 621 of the yoke 62. The pressing member 7 presses the slide member 5 toward the first case member 21 accordingly so that the first meshable portion 51 and the second meshable portion 211 mesh with each other. Specifically, the moving force of the armature 63 is applied to the tip ends of the leg portions 72 of the pressing member 7, thus causing the pressing member 7 to press the slide member 5 toward the first case member 21. At this time, the ring portion 71 of the pressing member 7 abuts against the axial end surface 53b of the cylindrical portion 53 of the slide member 5 on the side opposite to the side where the first meshable portion 51 is located.

When the first meshable portion 51 and the second meshable portion 211 mesh with each other, the driving force inputted from the ring gear 23 to the differential case 2 is transmitted to the drive shafts via the slide member 5, the pair of pinion shafts 30, the four pinion gears 31, and the pair of side gears 32. Thus, the vehicle operates in a four-wheel drive mode.

A position sensor 10 detects a position of the armature 63 in the axial direction and outputs a detect to signal, indicative of the detected position, to the controller. The position sensor 10 includes a contact member 11 and a supporting member 12 that supports the contact member 11. The contact member 11 is reciprocable relative to the supporting member 12 in the direction parallel to the rotation axis O of the differential case 2. A tip end of the contact member 11 is in elastic contact with the side plate portion 632 of the armature 63. The supporting member 12 is fixed to the differential carrier. The controller identifies the position of the armature 63 from the detection signal of the position sensor 10 and determines, based on the identified position, whether the first meshable portion 51 and the second meshable portion 211 mesh with each other.

The controller activates the actuator 6 that remains inactivated by supplying the electromagnet 61 with the exciting current having a value large enough to move the slide member 5 quickly. Then, when determining that the first meshable portion 51 and the second meshable portion 211 mesh with each other, the controller reduces the exciting current to a value that is relatively small, but enough to keep the first meshable portion 51 and the second meshable portion 211 meshing with each other. This approach reduces power consumption.

As described above, according to the first embodiment, the differential case 2 includes the first case member 21 and the second case member 22 that are united to form the differential case 2, and the first case member 21 integrally includes the flange portion 212 that the ring gear 23 is fastened to and the second meshable portion 211 to mesh with the first meshable portion 51 of the slide member 5. The driving force inputted from the ring gear 23 is transmitted to the slide member 5 through only the first case member 21 out of the first and second case members 21 and 22. The driving force is then transmitted from the slide member 5 to the pinion shaft 30 of the differential mechanism 3. Thus, a path for transmitting the driving force does not include the wall portion 222 of the second case member 22 that has the insertion holes 222a that the leg portions 72 of the pressing member 7 are inserted through. This reduces an increase in the weight and of the differential case 2 and also allows the driving force to be selectively transmitted in accordance with the axial movement of the slide member 5.

Next, a differential apparatus according to a second embodiment of the invention is described with reference to FIG. 8 and FIG. 9. The differential apparatus according to the second embodiment differs from the differential apparatus 1 according to the first embodiment in the structure of an input member of a differential mechanism. Hence the structure of the input member is described. Features similar to those described in the first embodiment are not described in this embodiment and are denoted in FIG. 8 and FIG. 9 by the same reference numerals as in the first embodiment.

Figure 8:
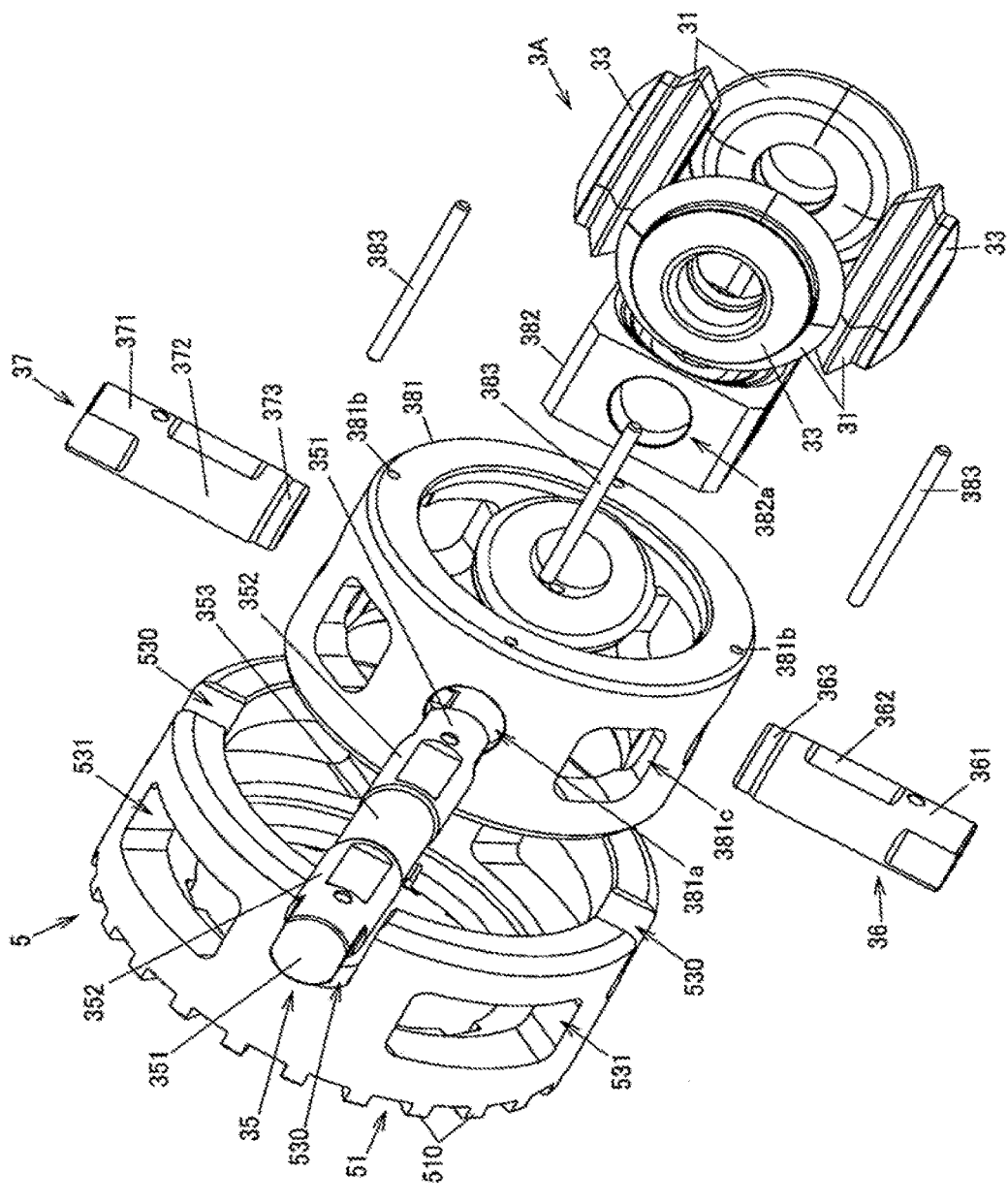
FIG. 8 is an exploded perspective view illustrating a differential mechanism and a slide member according to a second embodiment of the invention.
Figure 9:
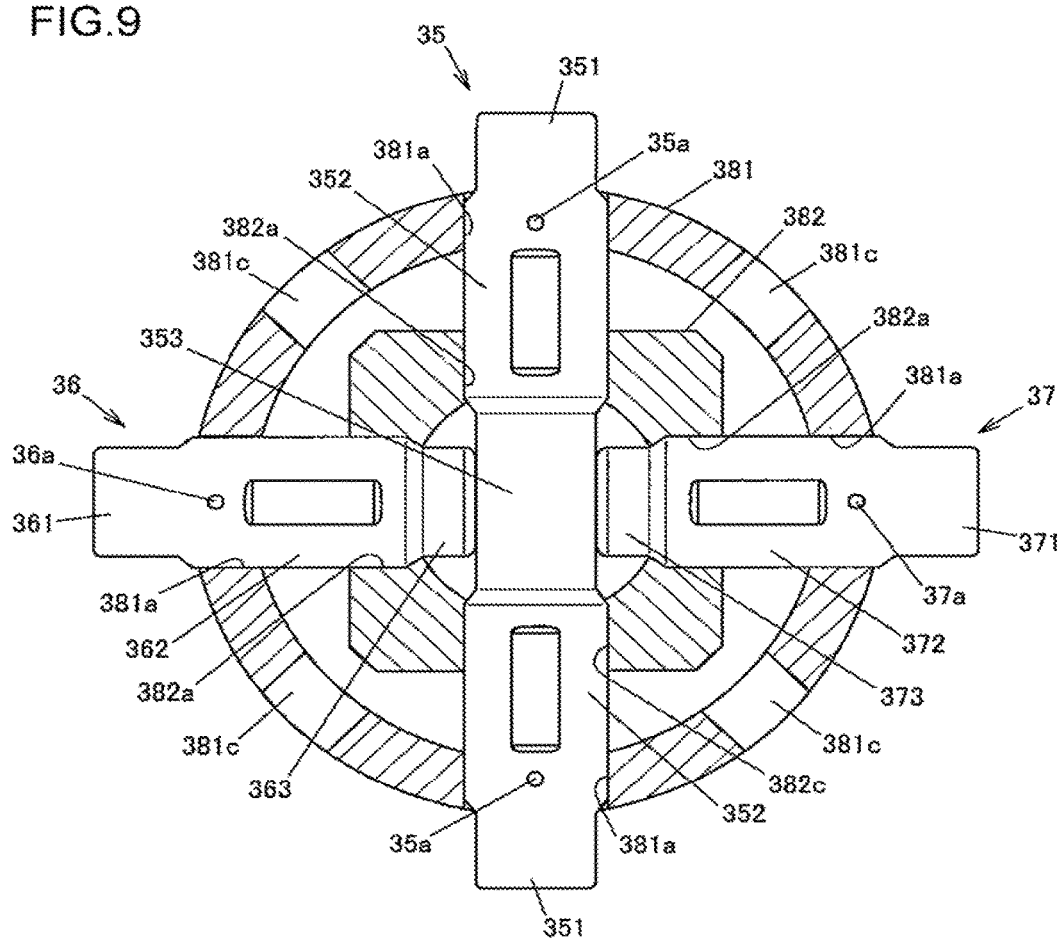
FIG. 9 is a partial cross-sectional view illustrating first, second, and third pinion shafts of the differential mechanism and illustrating cross-sections of a first supporting member and a second supporting member.

FIG. 8 is an exploded perspective view illustrating a differential mechanism 3A and a slide member 5 according to this embodiment. FIG. 9 is a partial cross-sectional view illustrating first, second, and third pinion shafts 35, 36, and 37 of the differential mechanism 3A and illustrating cross-sections of a first supporting member 381 and a second supporting member 382.

According to this embodiment, the differential mechanism 3A has the first, second, and third pinion shafts 35, 36, and 37 that each has a shaft shape. The four pinion gears 31 are rotatably supported by the first, second, and third pinion shafts 35, 36, and 37. It is noted that for the sake of simplicity, FIG. 8 omits the illustration of the pair of side gears 32 that mesh with the four pinion gears 31. Each of the first, second, and third pinion shafts 35, 36, and 37 serves as an input member of the differential mechanism 3A. The differential mechanism 3A further has the first supporting member 381 and the second supporting member 382 that support the first, second, and third pinion shafts 35, 36, and 37.

The first pinion shaft 35 integrally includes a pair of engaged portions 351 that are engaged with the engaging portions 530 of the slide member 5, a pair of pinion gear supporting portions 352 that are inserted through the pinion gears 31, and a connector 353 that connects the pair of pinion gear supporting portions 352 together. The second pinion shaft 36 has an engaged portion 361 at one end and has a butting portion 363 at the other end. The engaged portion 361 is engaged with the engaging portion 530 of the slide member 5. The butting portion 363 butts against the connector 353 of the first pinion shaft 35. The second pinion shaft 36 further has a pinion gear supporting portion 362 between the engaged portion 361 and the butting portion 363. The pinion gear supporting portion 363 is inserted through the pinion gear 31.

Like the second pinion shaft 36, the third pinion shaft 37 has an engaged portion 371 at one end, a butting portion 373 at the other end, and a pinion gear supporting portion 373 between the engaged portion 371 and the butting portion 373. The engaged portion 371 is engaged with the engaging portion 530 of the slide member 5. The butting portion 373 butts against the connector 353 of the first pinion shaft 35. The pinion gear supporting portion 372 is inserted through the pinion gear 31.

The first, second, and third pinion shafts 35, 36, and 37 are inserted through insertion holes 381a of the first supporting member 381 and insertion holes 382a of the second supporting member 382. The first supporting member 381 has a round cylindrical shape and is located inside the slide member 5. The second supporting member 382 has a rectangular cylindrical shape and is located inside the first supporting member 381. The four pinion gears 31 are located between the first supporting member 381 and the second supporting member 382.

Four pins 383 are used to present the first, second, and third pinion shafts 35, 36, and 37 from rotating relative to the first supporting member 381. FIG. 8 illustrates three of the four pins 383. The first supporting members 381 has four pin insertion holes 381b that the puts 383 are separately inserted through. The first supporting member 381 further has four oil holes 381c that lubricating oil flows through. The first pinion shaft 35 has two pin insertion holes 35a that each is located between the engaged portion 351 and the pinion gear supporting portion 352. The second pinion shaft 36 has a pin insertion hole 36a between the engaged portion 361 and the pinion gear supporting portion 362. The third pinion shaft 37 has a pin insertion hole 37a between the engaged portion 371 and the pinion gear supporting portion 372. The four pins 383 are fixed in the pin insertion holes 381b, 35a, 36a, and 37a, for example, by press-fit fixation.

The second embodiment achieves the same effect as that described in the first embodiment.

Next, a differential apparatus according to a third embodiment of the invention is described with reference to FIG. 10. The differential apparatus according to the third embodiment differs from the differential apparatus 1 according to the first embodiment in the structure of an input member of a differential mechanism. Hence the structure of the input member is described. Features similar to those described in the first embodiment are not described in this embodiment and are denoted in FIG. 10 by the same reference numerals as in the first embodiment.

Figure 10:
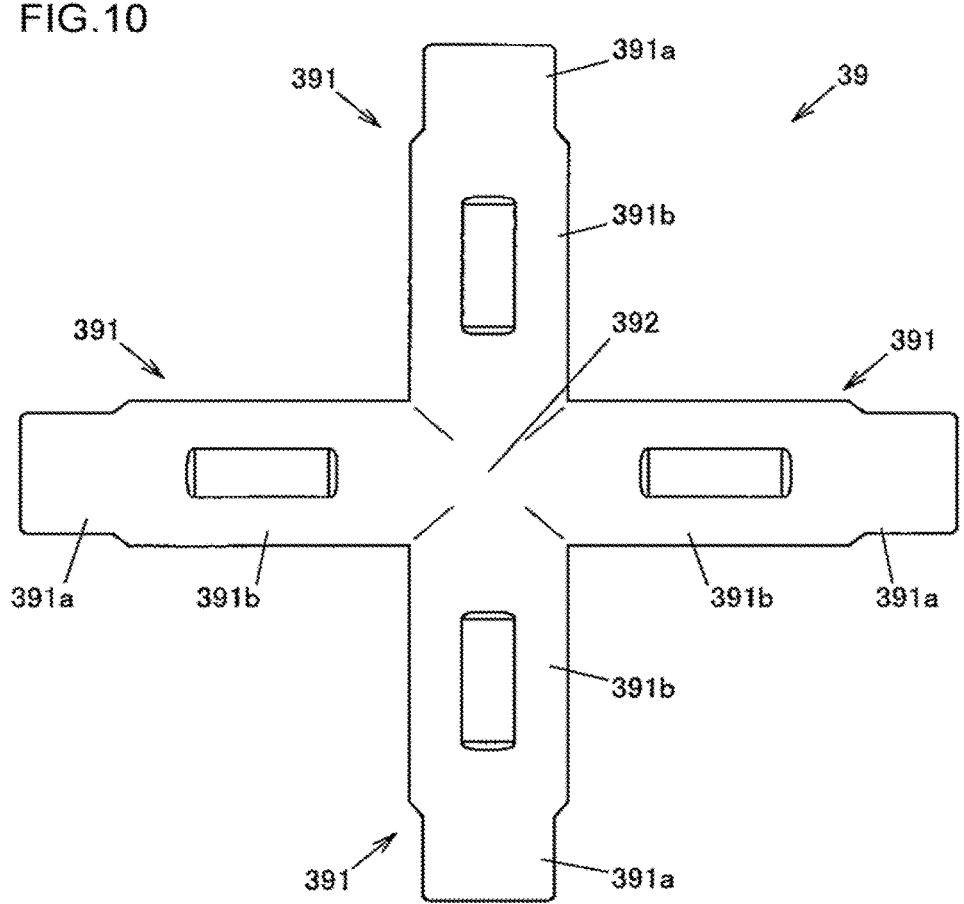
FIG. 10 is a diagram illustrating a pinion gear support member as an input member of a differential mechanism according to a third embodiment of the invention.

FIG. 10 is a diagram illustrating a pinion gear supporting member 39 as an input member of the differential mechanism according to this embodiment. According to this embodiment, the pinion gear supporting member 39 supports the pinion gears 31, and includes four shaft portions 391 and a connector 392 that connects the shaft portions 391 together. Each of the shaft portions 391 includes an engaged portion 391a and a pinion gear supporting portion 391b. The engaged portion 391a is engaged with the engaging portion 530 of the slide member 5. The pinion gear supporting portion 391b rotatably supports the pinion gear 31. The four shaft portions 391 are radially arranged and formed as a single piece such that the pinion gear supporting member 39 has a cross shape when viewed from the central axial direction. Each of the four shaft portions 391 is engaged at one end with a corresponding one of the engaging portions 530 of the slide member 5 and also rotatably supports a corresponding one of the pinion gears 31.

The third embodiment achieves the same effect as that described in the first embodiment.

What is claimed is:

1. A differential apparatus comprising:
a differential mechanism that allows a driving force inputted to an input member to be differentially distributed to a pair of output members;
a differential case that accommodates the differential mechanism; and
a clutch mechanism that transmits the driving force between the differential case and the input member of the differential mechanism, wherein
the clutch mechanism includes a slide member arranged in a manner that allows the slide member to move relative to the differential mechanism inside the differential case in a central axial direction along a rotation axis of the differential case and that does not allow the slide member to rotate relative to the differential mechanism inside the differential case, the clutch mechanism further including an actuator for supplying the slide member with a moving force that moves the slide member in the central axial direction,
the slide member includes a first meshable portion that is located at one end of the slide member in the central axial direction and that has a first plurality of meshable teeth,
the differential case includes a plurality of case members that are united to form the differential case, the plurality of case members including a first case member, the first case member including a second meshable portion having a second plurality of meshable teeth facing the first meshable portion in the central axial direction, the first case member further including a joint portion that an input gear that rotates along with the differential case is joined to, and the differential apparatus switches between a coupled state and a decoupled state in accordance with whether the actuator is activated or deactivated, the coupled state causing the first meshable portion and the second meshable portion to mesh with each other in a circumferential direction so that the differential case and the slide member are coupled not to allow a relative rotation between the slide member and the differential case, the decoupled state decoupling the differential case and the slide member from each other to allow the relative rotation between the slide member and the differential case.

2. The differential apparatus according to claim 1, wherein
the slide member of the clutch mechanism is located inside the differential case,
the actuator of the clutch mechanism is located outside the differential case,
the moving force of the actuator is transmitted to the slide member through a pressing member that is located between the actuator and the slide member, the plurality of case members further includes a second case member including a wall portion having a plurality of insertion holes,
the slide member is located between the second meshable portion and the wall portion, and
the pressing member has a plurality of leg portions, each leg portion inserted through a corresponding one of the plurality of insertion holes.

3. The differential apparatus according to claim 2, wherein
the input gear is fixed to the differential case by a plurality of bolts,
each of the first case member and the second case member includes a flange portion having a plurality of bolt insertion holes, and
each of the plurality of bolts is inserted through a corresponding one of the plurality of bolt insertion holes.

4. The differential apparatus according to claim 2, wherein
the second case member has a round cylindrical shape with a bottom and accommodates the differential mechanism and the slide member, and
an opening of the second case member is covered with the first case member.

* * * * *